May 13, 1941.   R. J. RINEHART   2,241,675
ROTARY PLOW
Filed Oct. 13, 1939   2 Sheets-Sheet 2

INVENTOR.
R. J. Rinehart
BY
ATTORNEY

Patented May 13, 1941

2,241,675

UNITED STATES PATENT OFFICE 2,241,675

ROTARY PLOW

Roscoe J. Rinehart, Isleton, Calif., assignor to Rio Farms, San Francisco, Calif., a corporation of California Application October 13, 1939, Serial No. 299,278

4 Claims. (Cl. 97—40)

This invention relates to rotary plows such as are used in chopping up asparagus roots in the ground after the plants have passed their period of commercial usefulness, and which include a plurality of ground engaging cutting or plowing blades mounted in a circular path about a rotary axis.

The main object of the invention is to shape and mount the blades so that they may be reversed in position relative to their direction of rotation and so that the diameter of their circular path may be altered.

By reversing the blades, I present a different cutting and wearing edge to the ground, thereby eliminating the need of frequent resharpening and assuring even wear of the blades. By altering the diameter of the rotary cutter as a whole, the cutting leverage of the implement may be altered as the conditions of the ground may demand, without straining or "gearing down" the drive mechanism, while enabling a maximum plowing capacity to be maintained.

A further object is to provide what I believe to be a novel form of growth deflector, adjustably mounted on the implement ahead of the rotary cutter.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
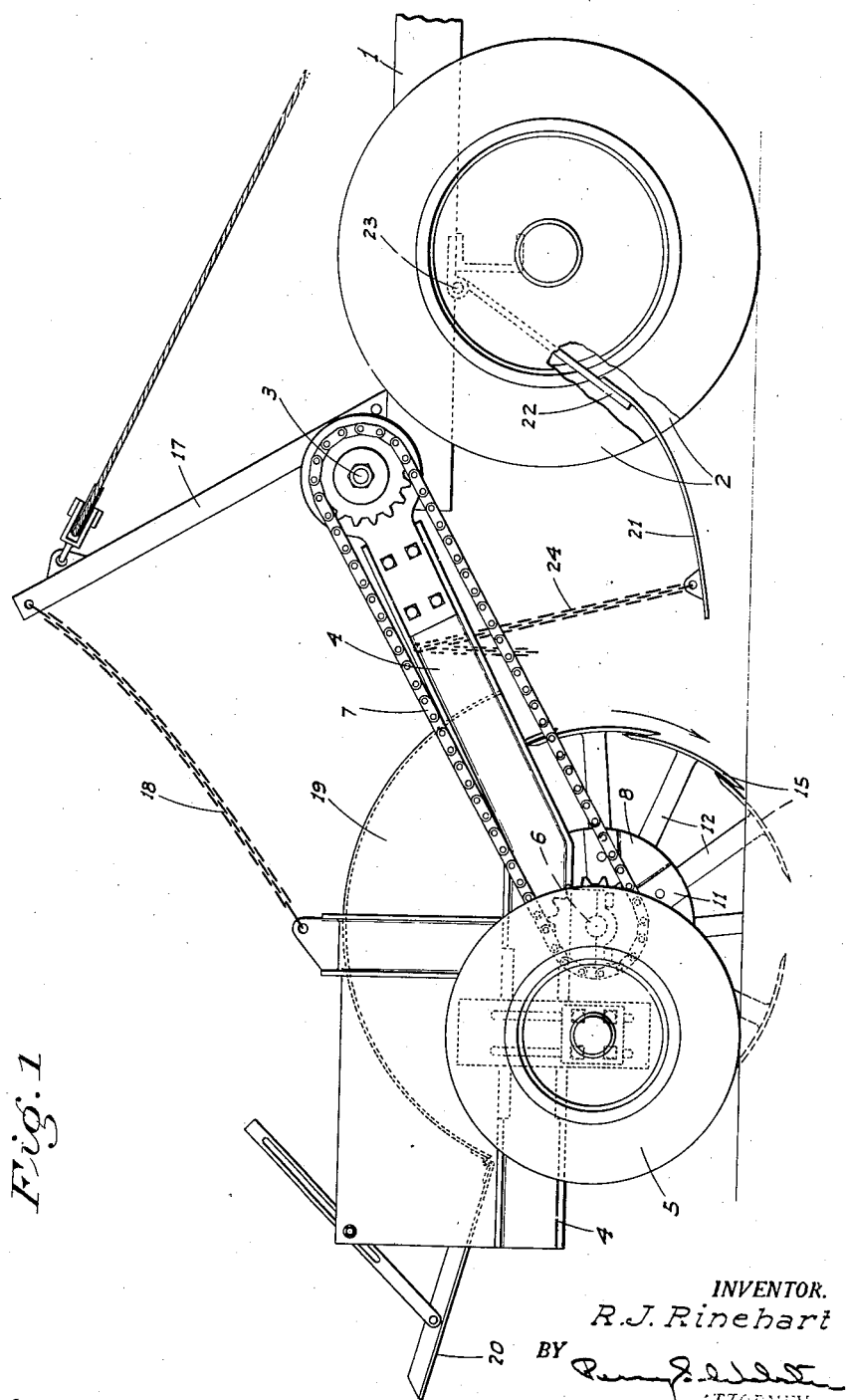
Figure 1 is a fragmentary side elevation of the implement.

Referring now more particularly to the characters of reference on the drawings, the implement comprises a power driven chassis which includes a frame 1 and rear driven wheels 2 supporting the frame. Projecting rearwardly and downwardly from frame 1 and turnable about a driven transverse shaft 3 thereon as an axis are auxiliary side frames 4 supported near their rear end by vertically adjustable wheels outwardly of the frames and one of which is shown at 5.

Supported from and under frames 4 is a rotary transverse shaft 6, driven from shaft 3 by chain drive means 7. The shaft 3 in turn is driven from the power plant of the chassis in any conventional manner.

Mounted on the shaft 6 is the rotary plow unit. This comprises a plurality of discs 8 having hubs 9 slidably keyed on the shaft and maintained in any set position by set screws 10 in the hubs. On one side of each hub is formed a plurality of evenly spaced sockets 11 of rectangular cross section. These are disposed at an acute angle to radial lines, in a backward direction relative to the direction of rotation of the unit. Standards 12 of corresponding cross section slidably and reversibly project into the sockets, each being held against removal and in any desired set position by a set screw 13 in the corresponding socket engaging any one of a number of depressions 14 arranged in rows lengthwise of the standard on both sides of said standard.

Secured on the outer end of each standard is a diamond shaped blade 15, whose major axis extends in a plane circumferentially of the unit or in the direction of rotation of the blade. The blades are curved from end to end on a radius approximating that of their path of rotation, and said blades are beveled as at 16 on their radially inward faces to provide cutting edges extending about the entire periphery of the blades.

Figure 2:
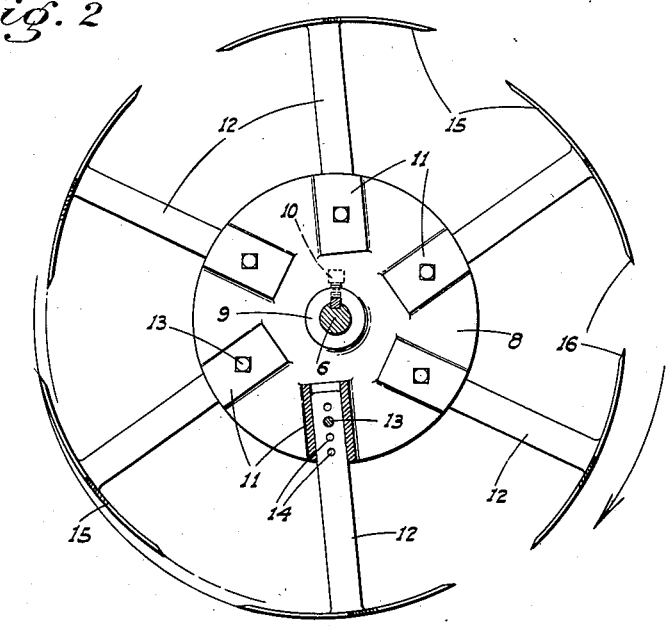
Figure 2 is a side elevation, partly in section, of one of the rotary plow units detached.

The center of curvature of the blades is on the median line of the standards, and due to the angularity of setting of the standard relative to lines radially of the shaft, said blades slope radially in toward their trailing ends, as plainly shown in Fig. 2, thus giving the blades the necessary digging clearance. Due to the symmetrical curvature of the blades relative to the standards, the above condition will obtain with any setting of the standards.

It will therefore be seen that when the standards are set in one position the leading two sides of each blade are doing the cutting and are subjected to the abrasive and dulling action of the earth. When the standards are reversed in the sockets, the remaining two sides of the blades do the cutting, and in this manner, each blade may be efficiently used twice as long as the ordinary single-edge blade before it must be removed for resharpening.

By the use of relatively long diamond shaped blades as shown, much of the heat generated at their leading side by the digging action is quickly carried away by the rear idle portion of the blades.

By shifting the standards radially in or out, the diameter of the plow is altered, thus altering the leverage at the ground as conditions may require. At the same time, the depth of cutting need not be altered, since this is governed by the setting of wheels 5.

Figure 3:
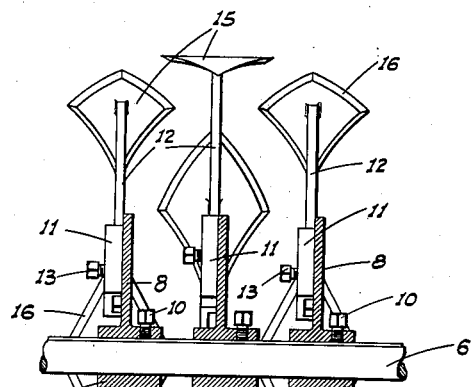
Figure 3 is a fragmentary transverse section of the unit.
Figure 4:
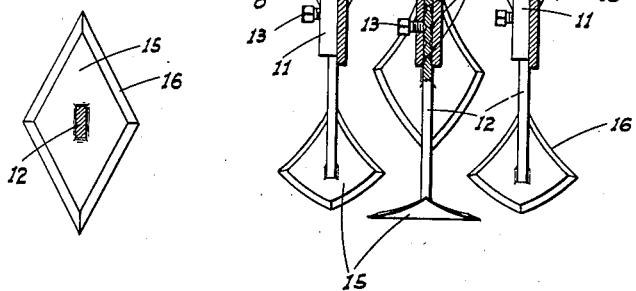
Figure 4 is a plan view of a double-ended reversible blade.

The discs 8 are disposed on shaft 6 so that alternate sockets and standards are staggered, and the width of the blades is such that they extend into overlapping planes, as clearly shown in Fig. 3. If a greater or lesser compactness in plowing operations is required, the discs 8 are shifted along the shaft one way or the other by first loosening the set screws 10.

The plowing unit may be raised clear of the ground for blade changing or transportation by means of a power-swung boom 17 mounted on frame 1 ahead of shaft 3, and connected to frame 4 above the rotary unit by suitable means such as a chain 18 which is slack when wheels 5 are riding on the ground.

In order to prevent the dirt as plowed up from being thrown about indiscriminately, the upper portion of the rotary unit is enclosed in a hood 19 mounted on frame 4; an adjustable dirt deflector 20 projecting rearwardly from the lower rear edge of the hood.

In order to depress upstanding growth ahead of the rotary unit, I provide an apron plate 21. This plate slopes up toward the front and is rigid with a supporting arm unit 22 which extends upwardly and forwardly from the plate and is pivotally swung at its upper end on the frame 1 adjacent the vertical center of the rear wheels as shown at 23 in Fig. 1.

At its rear end, the plate is adjustably supported from frame 4 by flexible members such as chain 24, which may be set so that the rear end of the apron clears the ground varying amounts as the size and height of the asparagus stalks or other growth depressed thereby may determine to be best.

The weight of the apron is such as to maintain the growth bent over ahead of the rotary cutter unit until the blades cut through the same near the ground, thus preventing such growth from possibly becoming entangled in the blades and their standards. At the same time, the yieldable mounting of the apron allows the same to lift without tending to lift the plowing unit and disturbing its digging depth in the event that the apron should encounter a relatively solid obstruction in its path.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A rotary plow comprising a rotary shaft adapted for movement along the ground, a disc fixed on the shaft, circumferentially spaced sockets on the disc disposed at an acute angle to lines radially of the disc, standards removably and reversibly engaging the sockets and projecting therefrom, double-ended blades mounted on the outer end of the standards in symmetrical relation thereto and means releasably holding the standards against removal from the sockets.

2. In a rotary plow, a rotary plowing unit, a supporting structure for the unit movable along the ground, a growth depressing apron disposed ahead of the unit with an upward slope from its rear end, means pivotally mounting the apron at its forward end on the structure for swinging movement in a vertical plane and a vertically adjustable flexible element mounted on the structure and supporting the apron adjacent its rear end.

3. In a rotary plow, a rotary plowing unit, a main wheel supported frame ahead of the unit, an auxiliary frame on which the unit is mounted pivoted at its forward end on the main frame for swinging movement in a vertical plane, a growth depressing apron ahead of the unit under the frames, means pivotally supporting the apron at its forward end from the main frame for swinging movement in a vertical plane and means supporting the apron adjacent its rear end from the auxiliary frame.

4. In a rotary plow, a rotary plowing unit, a supporting structure for the unit movable along the ground, a growth depressing apron disposed ahead of the unit and having an upward slope from its rear end, and means mounting the apron on the structure for positive vertical adjustment at its rear end.

ROSCOE J. RINEHART.